(12) United States Patent
Herrfurt et al.

(10) Patent No.: US 9,854,019 B2
(45) Date of Patent: Dec. 26, 2017

(54) METHOD AND APPARATUS FOR MODIFYING A STREAM OF DIGITAL CONTENT

(71) Applicant: SES Platform Services GmbH, Unterföhring (DE)

(72) Inventors: Matthias Herrfurt, München (DE); Lennart Sohst, Neufahrn (DE)

(73) Assignee: MX1 GmbH, Unterföhring (DE)

( * ) Notice: Subject to any disclaimer, the term of this patent is extended or adjusted under 35 U.S.C. 154(b) by 497 days.

(21) Appl. No.: 14/287,958

(22) Filed: May 27, 2014

(65) Prior Publication Data
US 2014/0365678 A1   Dec. 11, 2014

(30) Foreign Application Priority Data
Jun. 11, 2013   (EP) .................... 13 171 449

(51) Int. Cl.
| | | |
|---|---|---|
| G06F 15/16 | (2006.01) | |
| H04L 29/06 | (2006.01) | |
| H04N 21/234 | (2011.01) | |
| H04N 21/44 | (2011.01) | |
| H04N 21/81 | (2011.01) | |
| H04N 21/845 | (2011.01) | |
| G06Q 30/02 | (2012.01) | |
| H04H 20/10 | (2008.01) | |
| H04H 60/40 | (2008.01) | |
| H04H 60/81 | (2008.01) | |

(52) U.S. Cl.
CPC ....... *H04L 65/604* (2013.01); *G06Q 30/0276* (2013.01); *H04H 20/106* (2013.01); *H04H 60/40* (2013.01); *H04H 60/81* (2013.01); *H04N 21/23424* (2013.01); *H04N 21/44016* (2013.01); *H04N 21/812* (2013.01); *H04N 21/8455* (2013.01); *H04H 2201/37* (2013.01)

(58) Field of Classification Search
CPC ................................. H04N 21/23424
USPC ......................................... 709/231
See application file for complete search history.

(56) References Cited

U.S. PATENT DOCUMENTS

| | | |
|---|---|---|
| 5,600,366 A | 2/1997 | Schulman |
| 6,487,721 B1 | 11/2002 | Safadi |
| 6,704,930 B1 | 3/2004 | Eldering et al. |
| 8,051,445 B2 | 11/2011 | Barrett et al. |
| 8,260,950 B1 | 9/2012 | Bertz et al. |

(Continued)

FOREIGN PATENT DOCUMENTS

EP   2 398 239 A1   12/2011

OTHER PUBLICATIONS

Israeli Office Action for Israeli Patent Application No. 232830, dated Dec. 20, 2016 (4 pages).

*Primary Examiner* — Hamza Algibhah
(74) *Attorney, Agent, or Firm* — Meyertons Hood Kivlin Kowert & Goetzel, P.C.; Jeffrey C. Hood

(57) ABSTRACT

The invention relates to a method for modifying a stream of digital content received via a first data connection at a reproducing device, the stream of digital content being related to at least one time code. The method comprises the following steps when reproducing the stream of digital content: (a) receiving at least one cue point by the reproducing device via a second data connection; and (b) modifying the stream of digital content by the reproducing device when the at least one time code related to the stream of digital content matches the at least one cue point.

20 Claims, 4 Drawing Sheets

(56) References Cited

U.S. PATENT DOCUMENTS

Figure 1:
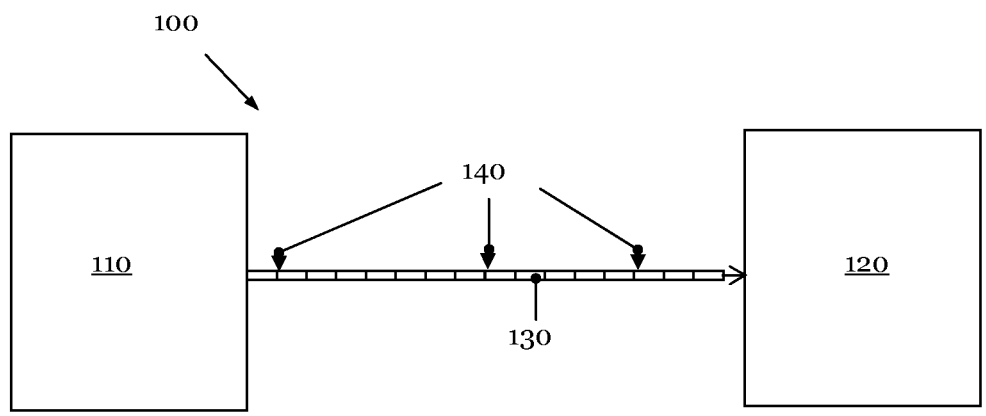

| | | | | |
|---|---|---|---|---|
| 2007/0055983 | A1* | 3/2007 | Schiller | H04N 21/23424 |
| | | | | 725/32 |
| 2008/0307454 | A1* | 12/2008 | Ahanger | G06Q 30/02 |
| | | | | 725/36 |
| 2011/0271299 | A1* | 11/2011 | Kakani | H04N 21/23424 |
| | | | | 725/36 |
| 2012/0054045 | A1* | 3/2012 | Beining | G06Q 30/0277 |
| | | | | 705/14.73 |
| 2012/0246672 | A1* | 9/2012 | Sridhar | H04N 21/23476 |
| | | | | 725/31 |
| 2013/0071087 | A1* | 3/2013 | Motiwala | H04N 21/8455 |
| | | | | 386/241 |
| 2013/0263180 | A1* | 10/2013 | Yang | H04N 21/25891 |
| | | | | 725/32 |
| 2013/0305276 | A1* | 11/2013 | Barhate | H04N 21/812 |
| | | | | 725/32 |

* cited by examiner

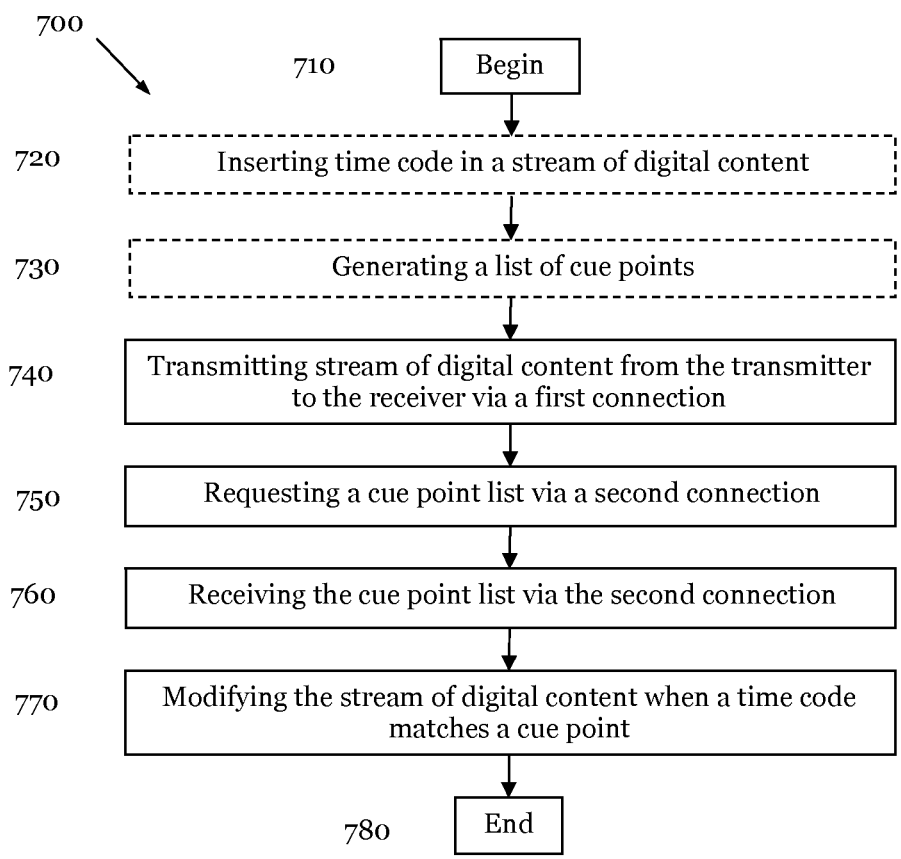

METHOD AND APPARATUS FOR MODIFYING A STREAM OF DIGITAL CONTENT

PRIORITY CLAIM

This application claims benefit of priority of European application no. 13 171 449.5 titled "Method and Apparatus for Modifying a Stream of Digital Content", filed Jun. 11, 2013, and whose inventors are Matthias Herrfurt and Lennart Sohst.

INCORPORATED BY REFERENCE

European application no. 13 171 449.5 titled "Method and Apparatus for Modifying a Stream of Digital Content", filed Jun. 11, 2013, and whose inventors are Matthias Herrfurt and Lennart Sohst, is hereby incorporated by reference in its entirety as though fully and completely set forth herein.

TECHNICAL FIELD

The present invention relates to the field of modifying a stream of digital content.

DESCRIPTION OF THE RELATED ART

Video content, audio content and/or multimedia streams can nowadays also be requested by a user via the Internet and are then transmitted as streams of digital data to a device of the user which reproduces the streams of digital data either in real time or stores the digital content stream in a memory and reproduces the digital data on request at a later time. On the other hand, video and/or audio content is at the moment and in the future mainly broadcasted as streams of digital content by transmitting devices both via wired and wireless networks. In the following, a stream of digital content may for example comprise video content, audio content, multi-media content and may also comprise text and/or images.

For the transport via a wired or wireless network a stream of digital content is typically compressed and multiplexed to an MPEG-2 transport stream (MPEG-2 TS). For this process typically methods of MPEG (motion picture experts group) standards are used. Presently often MPEG-2 or MPEG-4 AVC (advanced video coding)/H.264 is applied as video encoding method. After the encoding process, a packetization process transforms a stream of digital content, or an elementary stream into a packetized elementary stream (PES) which is a stream of variable size packets each having a header and a payload. Finally, the PES packet data are multiplexed into the payload of MPEG-2 TS packets with a fixed size of 188 bytes. The MPEG-2 TS packet header contains a PID (packet identifier) which allows identification of all packets belonging to the same elementary stream. In the context of the MPEG-2 system standard, a program comprises a collection of video, audio and data PID streams within a transport stream. In the context of MPEG-2 video encoding, video sequence headers within a video elementary stream indicate parameters, such as frame rate, resolution and coordinates of the screen where the display of the image should start.

An MPEG-2 Transport Stream (MPEG-2 TS) multiplexes various PESs into a single stream along with synchronization information in a single program transport stream (SPTS). A TS can also comprise the PESs of several programs which is called multi program transport stream (MPTS). For example, a video or a TV channel may be formed from the PES of the elementary stream of a video source and one, two or more PESs of the elementary stream(s) of an audio source.

Program specific information (PSI) is added in a specialized stream (tables) to the TS comprising program descriptions and assignments of PIDs and PESs to video and/or audio programs. The PSI comprises a program association table (PAT) and a program map table (PMT). The PAT, which is transmitted with PID 0, contains a list of all programs of the TS together with the PID for the PMT for each program. The PMT describes the PIDs for each of the program components contained in the TS.

It is often necessary or at least desirable enrich a program with additional content for specific user groups. For example, it may be necessary to add text or a banner to a video frame or video frames in order to inform a user of latest news or of an emergency while viewing a program as for example a video or a movie. The additional content may be provided from a second content provider which is different from a first content provider providing the program. Further, it may be beneficial to add or remove a sequence from a video in order to replace it by another one, for example a newer one. Moreover, it may be desirable to add information to a program which is specific for a local area as for example local news or weather forecasts. Additionally, it may be desirable to add advertisement to video frames and/or to interrupt the program to present advertisement to the user.

The elementary stream of additional information can be inserted or spliced into an elementary stream of the actual program either at the transmitter side or at the receiver side. In the first case, the transmitter or a unit of the transmitter fetches all the media files from their respective locations and splices them together in a single PES and provides the PES contained in a TS to the users.

The U.S. Pat. No. 5,600,366, U.S. Pat. No. 6,487,721 B1, and US 2009/0 199 236 A1 disclose methods for splicing a second elementary stream into a first elementary stream based on cue tones contained in the analogue video streams or based on cue messages in digital video streams. The cue tones and cue messages, respectively, of a video stream indicate the position(s) within the video where a second elementary stream can be inserted.

These approaches suffer from the drawback that a regionalization or a localisation of additional content to be added to digital content streams is predetermined by the transmission structure of the digital content streams. Furthermore, it is not possible to take further factors for the localisation of the additional content into account. Such factors could for example be the number of persons in a home, the number of children, the available income, etc. Moreover, the methods disclosed in the documents mentioned in the preceding paragraph cannot be applied to content which is already recorded or stored in a receiving and reproducing device.

The splicing of two or more PES at the receiver side avoids these disadvantages. The U.S. Pat. No. 6,704,930 B1 discloses methods for the transport and the insertion of advertisements at the receiver side. A synchronization signal is used to indicate the appropriate point for the simultaneous insertion of advertisement in each program of the MPTS. Further, this document describes to use an own channel having a frequency distinct from the TS of the programs (or an out-of-band channel) for the transport of the advertisements.

However, it is unfavourable that cue points or cue point information which is available within the stream of digital content is not protected or only protected with weak security. This means that cue points in a TS are accessible to everybody. It is therefore a drawback of the approach of combining the first and the second PES at the receiver side is that a receiving and reproducing device may not be properly secured. Malware installed on the receiving and reproducing device can manipulate the parameter set or metadata of the cue point(s) of the first PES. This may cause skipping of the additional content provided by the second PES and only reproducing the content of the first PES. It is also possible to transmit the stream of received digital content from the receiving and reproducing device to a computer system having specific software which allows manipulating the cue point information contained in the first PES. Then the modified digital content stream is restored in the receiving and reproducing device and may for example be presented without the additional content of the second PES.

It is therefore one object of the present invention to provide a method and an apparatus for modifying a stream of digital content at a reproducing device which at least partially avoids the drawback mentioned above.

SUMMARY OF THE INVENTION

According to a first embodiment of the invention this problem is solved by a method according to claim 1. In a first aspect, a method for modifying a stream of digital content received via a first connection at a reproducing device comprises at least one time code related to the stream of digital content. The method comprises the following steps when reproducing the stream of digital content: (a) receiving at least one cue point by the reproducing device via a second connection; and (b) modifying the stream of digital content by the reproducing device when the at least one time code related to the stream of digital content matches the at least one cue point.

According to a second aspect of the invention this problem is solved by a method according to claim 2. In a second embodiment, a method for modifying a stream of digital content transmitted via a first connection by a transmitting device comprises at least one time code related to the stream of digital content. The method comprises the following steps: (a) generating at least one cue point for the stream of digital content; and (b) transmitting the at least one cue point via a second connection, the at least one cue point modifying the stream of digital content when the at least one time code related to the stream of digital content matches the at least one cue point.

A third aspect of the invention is directed to claim 3. In a third embodiment, a method for modifying a stream of digital content by a cue point providing entity comprises transmitting the stream of digital content from a transmitting device to a reproducing device via a first connection, and comprises at least one time code related to the stream of digital content. The method comprises the following steps: (a) receiving at least one cue point for the stream of digital content; and (b) transmitting the at least one cue point via a second connection, the at least one cue point modifying the stream of digital content when the at least one time code related to the stream of digital content matches the at least one cue point.

The inventive method avoids a manipulation of cue points at the receiver side by transmitting cue points not within the transport stream (TS) of a stream of digital content. Rather, only a time code is inserted in the stream of digital content for signaling the reproducing device where additional content is to be inserted in the stream of digital content. At the transmitter side a list of cues or cue points including their respective parameter sets or meta data is generated. This list of cue points is transmitted from the transmitter side to the receiver side on request by the receiving and reproducing device. However, this transmission does neither occur within the SPTS or MPTS containing the stream of digital content nor within the network providing the data connection of the SPTS or MPTS. But a second data connection different from the first data connection is used for the transmission of the list of cue points to the receiving and reproducing device. A malware on an individual reproducing device or on a separate computer system monitoring the TS in order to find cue points, which it can manipulate or use in an abusive way, cannot do any harm.

A further benefit of the inventive method is that it can also be applied to a stream of digital content recorded or stored in a reproducing device. Thus, the inventive method allows that actual additional information can dynamically be inserted or spliced in a stream of digital content stored in a reproducing device during its presentation or reproduction by the reproducing device. This means that even digital content which has been manipulated for example by removing the respective cue points can correctly be reproduced by inserting the additional content in the stream of digital content during its reproduction.

Another aspect further comprises the step of transmitting at least one request for the at least one cue point by the reproducing device. In a further aspect at least one signaling of the stream of digital content triggers the step of transmitting the at least one request for the at least one cue point. According to an alternative aspect, the reproducing device triggers the step of transmitting the at least one request for the at least one cue point. In a further aspect, the at least one request for the at least one cue point is periodically transmitted.

In a further aspect, the at least one request transmitted by the reproducing device is received by the transmitting device. In an alternative aspect, the at least one request transmitted by the reproducing device is received by the cue point providing entity.

In still a further aspect, the at least one request for the at least one cue point is transmitted via the second connection.

According to another aspect, the second connection comprises an out-of-band connection. Beneficial out-of-band connections comprise a secured Internet connection, in particular a hypertext transfer protocol secure (HTTPS) protocol, an unsecured connection with proprietary encoded data, or a combination thereof.

An advantageous aspect comprises the step of modifying the digital content removing digital content, exchanging digital content by new digital content and/or inserting new digital content in the received stream of digital content at the at least one cue point. According to a further aspect, the step of modifying the digital content comprises using control information stored in the reproducing device.

Another aspect further comprises the step of inserting at least one time code into the stream of digital content. According to another aspect the at least one cue point comprises parameters having instructions modifying the stream of digital content.

In a further aspect a reproducing device for modifying a stream of digital content being related to at least one time code comprises: (a) means for receiving the stream of digital content via a first connection and/or means for storing the stream of digital content; (b) means for receiving at least one cue point via a second connection; and (c) means for modifying the stream of digital content when the at least one time code related to the stream of digital content matches the at least one cue point.

According to another aspect a transmitting device for modifying a stream of digital content being related to at least one time code comprises: (a) means for transmitting the stream of digital content via a first connection; (b) means for generating at least one cue point for the stream of digital content; and (c) means for transmitting the at least one cue point via a second connection, the at least one cue point modifying the stream of digital content when the at least one time code related to the stream of digital content matches the at least one cue point.

Moreover, in still a further aspect, a cue point providing entity for modifying a stream of digital content, wherein the stream of digital content is transmitted from a transmitting device to a reproducing device via a first connection, and the stream of digital content is related to at least one time code, comprises: (a) means for receiving at least one cue point for the stream of digital content; and (b) means for transmitting the at least one cue point via a second connection, the at least one cue point modifying the stream of digital content when the at least one time code related to the stream of digital content matches the at least one cue point.

Finally, in yet another aspect a computer program has instructions to perform the steps of any of the methods according to any aspects described above.

SHORT DESCRIPTION OF THE DRAWINGS

In order to better understand the present invention and to appreciate its practical applications, the following figures are provided and referenced hereafter. It should be noted that the figures are given as examples only and in no way limit the scope of the invention.

Figure 2:
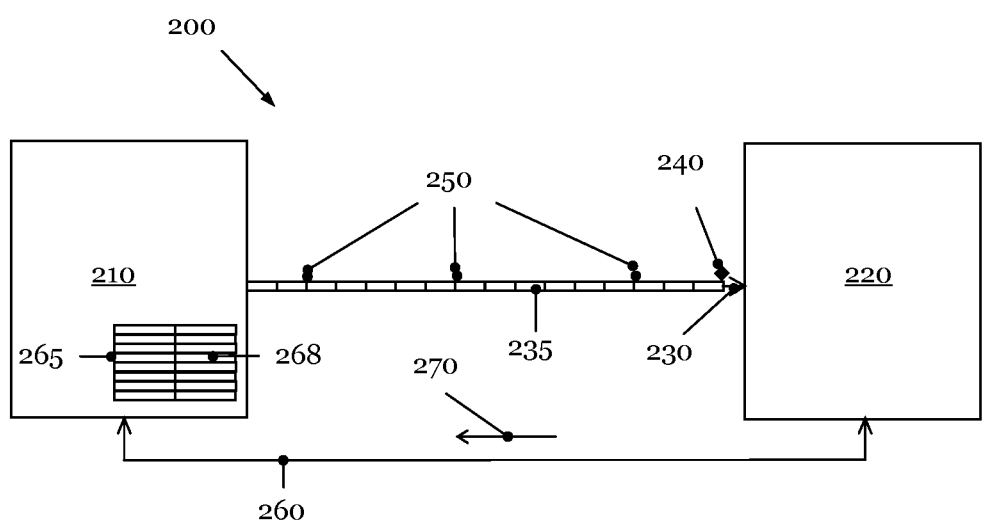
Figure 3:
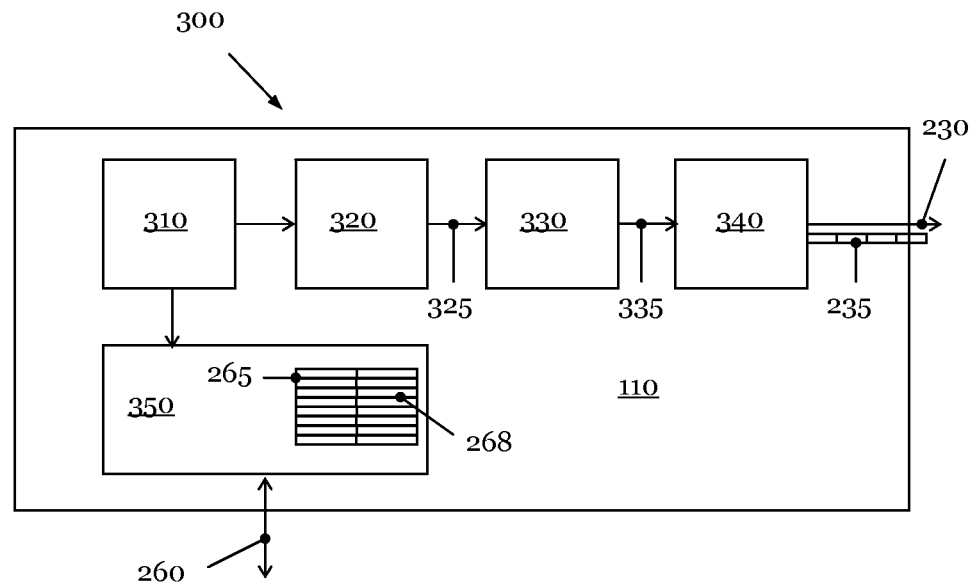
Figure 4:
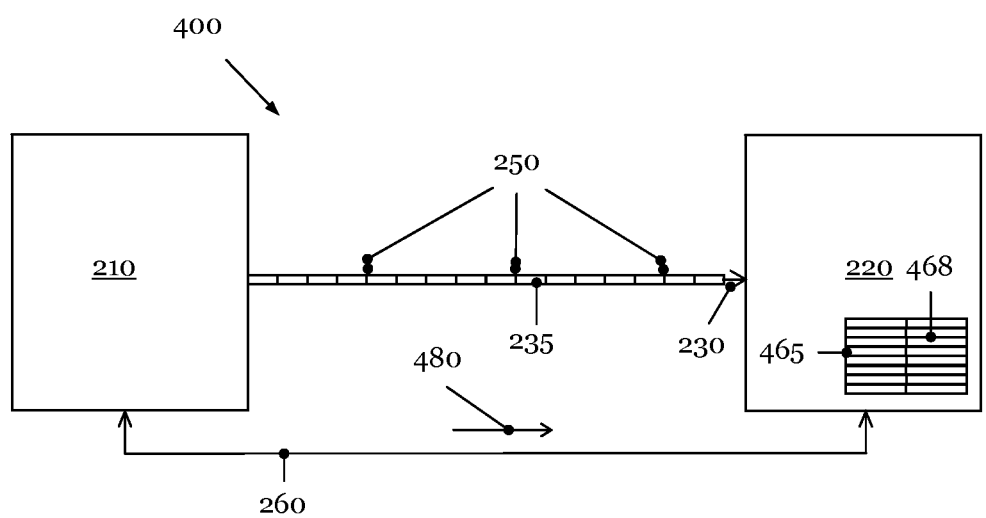
Figure 5:
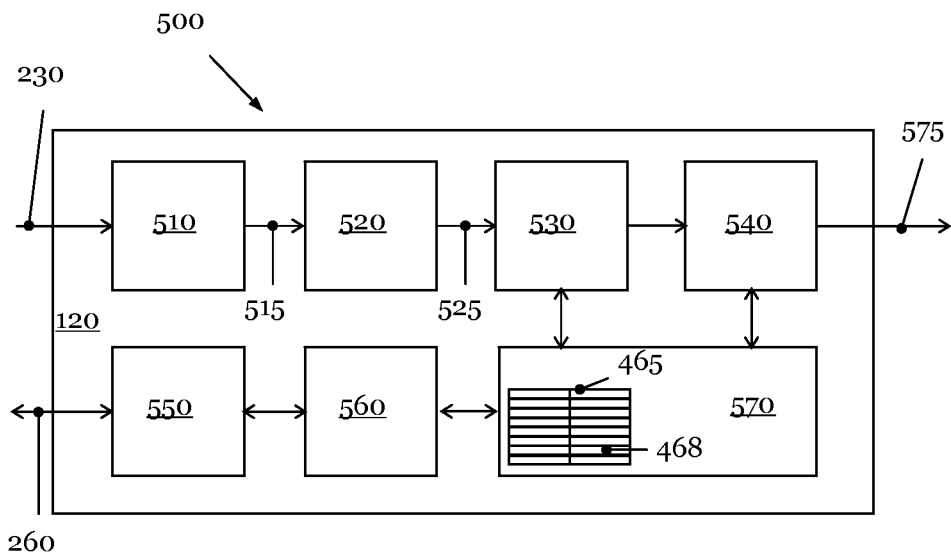
Figure 6:
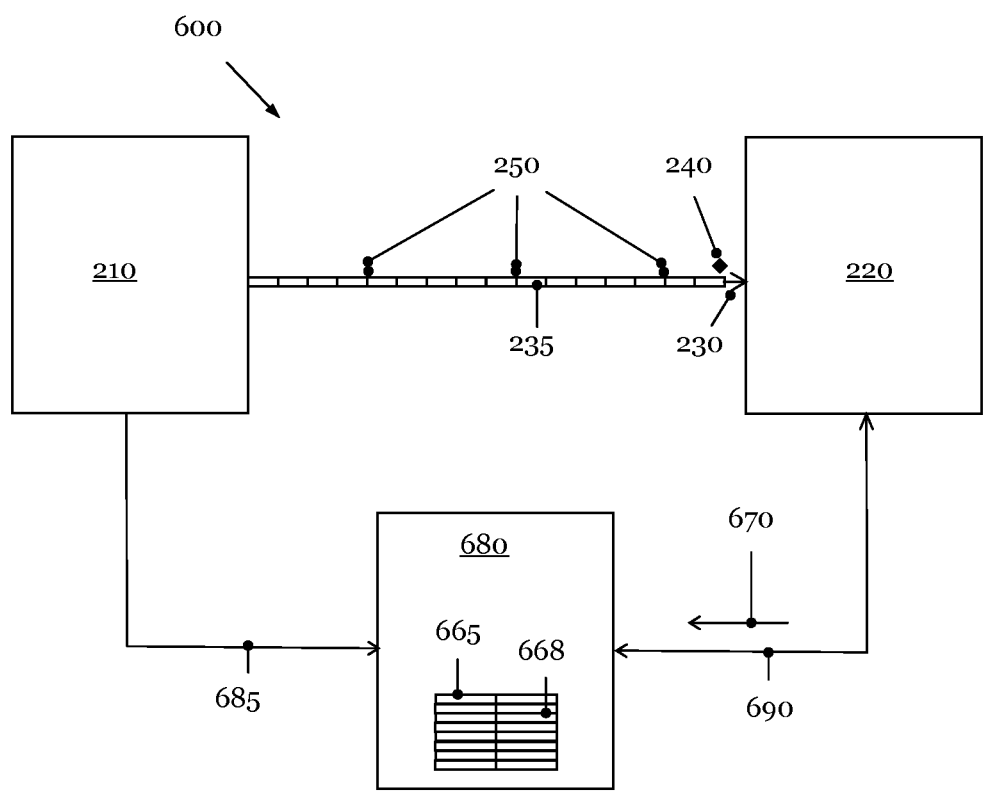

FIG. 1 schematically shows the transmission of a transport stream from a transmitting device to a receiving and reproducing device, wherein one or more packetized elementary streams (PESs) have cue points according to the prior art;

FIG. 2 schematically illustrates the generation of a cue point list and the insertion of time code in a stream of digital content or a PES by a transmitting device in an embodiment of the invention;

FIG. 3 schematically represents some components of a transmitting device broadcasting a stream of digital content and for generating and transmitting a cue point list;

FIG. 4 schematically illustrates a high level view of a receiving and reproducing device receiving a TS containing the stream of digital content;

FIG. 5 schematically presents some components of a receiving and reproducing device receiving the stream of digital content and receiving a cue point list;

FIG. 6 schematically shown an alternative configuration of the communication system of FIG. 2; and FIG. 7 depicts a flow chart of a method to modify the stream of digital content.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following, the present invention will now be described in more detail hereinafter with reference to the accompanying figures, in which exemplary embodiments of the invention are illustrated. How-ever, the present invention may be embodied in different forms and should not be construed as limited to the embodiments set forth herein. Rather, these embodiments are provided so that this disclosure will be thorough and will convey the scope of the invention to persons skilled in the art.

FIG. 1 schematically shows a communication system 100 according to the prior art. A transmitting device 110 transmits a transport stream (TS) 130 to a receiving and reproducing device 120. The TS 130 comprises one (i.e. SPTS) or several programs (i.e. MPTS) multiplexed into the TS 130. The receiving and reproducing device 120 or simply the receiver is designed to dynamically link additional content to the one or several programs transmitted within the TS 130. The terms receiving and reproducing device, reproducing device and receiver are interchangeably used in this application. In order to indicate the receiver 120 the position at which the additional content should be inserted into a program the respective packetized elementary stream (PES) of that program comprises cues or cue points 140.

There are many (thousands or millions) of individual receivers 120 receiving the TS 130. Some of them or many may not be properly protected against malware. Malware in a receiver 120 designated for attacking dynamic linkage of programs or digital program insertion (DPI) preferably monitors the TS 130 and attacks cue points 140 in order to manipulate their parameter sets or meta data. Additionally or alternatively, the malware can misuse cue points 140, for example in order to automatically remove the additional content from the program or for automatically interrupting the program. As a con-sequence, a screen of the receiving and reproducing device 120 (not indicated in FIG. 1) may not represent the content as intended by the content provider(s) and/or network operators. In the following, a method is described which solves this problem.

FIG. 2 schematically illustrates a communication system 200 in which an inventive principle is implemented. In the example shown in FIG. 2, the transmitting device 210 is a satellite transmitter or a satellite uplink transmitter which sends for example a 27 Mbps (Megabit per second) data stream to a satellite in a geostationary orbit (not shown in FIG. 2). The data stream to the satellite and from the satellite to the receiving and reproducing device 220 may contain one or several TSs 235 transmitted via a first data connection 230. The transmitting device 210 can also prepare a TS 235 for the transmission via a cable network (not illustrated in FIG. 2). Furthermore, the communication system 200 can also be switched to digital video systems which are generally based of various digital subscriber line systems referred to as xDSL (digital subscriber line) systems. Apart from all kinds of digital broadcasting systems, the method described in the following can also be applied to the streaming of digital content streams via the Internet. Moreover, it can also be applied to modern wireless networks which allow wireless access to the Internet.

FIG. 3 schematically shows some components of a transmitting device 300 of a playout center. For example, the playout center may be part of a direct broadcast satellite (DBS) television system or more generally of a direct-to-home (DTH) satellite television system. A playout automation system 310 controls one or several playout systems 320 by means of a playout schedule. The playout schedule describes the sequence as well as the start and end times of individual audio and/or video streams or assets which when combined form a continuous program (TV or audio channel) ready to broadcast. The individual audio and/or video streams or audio-visual streams can be obtained from various content providers as streams of analogue or digital content and are temporarily stored in the playout system 320. Cue points for the individual audio and/or video streams are derived from the playout schedule which is contained in the playout automation system 310.

The playout system 320 plays the audio-visual streams in an uncompressed digital format. The playout system 320 or a subordinated component inserts time code 250 in the actual audio-visual stream. The inserted time code 250 is synchronized to the time used in the playout automation system 310 and the playout schedule. For example, the synchronization time may be the local time determined from the UTC (coordinated universal time) or may refer to the beginning of an audio-visual stream.

Time code 250 is typically of the form hh:mm:ss:ff, i.e. hours, minutes, seconds and frames. It may also comprise the data when the video and/or audio data have been recorded. This means that the time code 250 preferably identifies an individual frame within a stream of digital content. Consequently, the time resolution of the presented method is a single video frame within a stream of digital content. The inserted time code 250 is preferably a digital vertical interval time code (DVITC). Other formats of time code 250 can also be used.

The played out audio and/or video stream is then fed into the compression system 330. The connection between the playout system 320 and the compression system 330 can for example be a HD-SDI interface (high definition-serial digital interface). However, this is just an example; other interfaces can also be used.

The compression system 330 encodes the stream of digital content representing a video and/or an audio content. A codec (coder/decoder) designed according to the MPEG-2 standard is presently often used for the encoding and compression of uncompressed digital streams of digital contents. On the other hand, there are a multitude of different codecs for different types of content and applications. The application of the inventive principle does not depend on the usage of a specific codec. Rather, all kind of codecs can be used as for example MPEG-4 AVC also known as H.264, audio codecs MP3, or AAC (advanced audio coding), or voice codecs G.711 or G.726 used in wireless access networks. The application of the method described here does not need the usage of any codec. Therefore, the compression system 330 in FIG. 3 is optional.

The time code 250 delivered within the input signal 325 of the compression system 330 is preferably extracted prior to the encoding process. A compression system 330 or an encoding process introduces a significant delay of the output signal 335 with respect to the input system 325 of the compression system 330. At the end of the encoding process in the compression system 330, the time code 250 is again added to the output signal 335. This is done is a way that the time code 250 at the output signal 335 reflects the relation of time code 250 and video frame at the input signal 325 of the compression system 330. This approach implies that the encoding delay introduced by the compression system 330 does not influence the relation of time code 250 and the respective video frame(s). For example, for the MPEG-2 codec, the time code 250 can be carried in the video sequence header of the header of a packet of the elementary stream (ES) within the output signal 335 of the compression system 330. When for example using the MPEG-2 TS, the time code 250 can be included in SEI (supplemental enhancement information) messages.

The output signal 335 of the compression system 330 is broadcasted by the transmitter unit 340 as a TS 230 typically added to a specific carrier frequency to multiple receiving and reproducing devices 220 via the first data connection 230. The transmitter unit 340 can be any conventional unit for wireless or wired transmission and is therefore not explained here.

The input signal to the transmitter unit 340 may be the output signal 335 of the compression system 330 (i.e. a SPTS) or may be output signals of several parallel compression systems 330 (i.e. a MPTS, not indicated in FIG. 3) in order to broadcast a multitude or a bouquet of TV and/or audio channels in the TS 235. In particular, one of the parallel compression systems 330 comprises a stream of compressed digital data comprising additional content which may be provided by at least one second content provider. A multiplexing unit (not shown in FIG. 3) combining the compressed output signals 335 of various parallel compression systems 330 can be a part of the transmitting unit 340. Alternatively, the multiplexing unit can be realized as a separate device. Furthermore, the multiplexer may also be part of the compression unit 330 so that the compression system 330 multiplexes various uncompressed input signals 325 each comprising a program into one single compressed transport stream.

In the exemplary system 300 of FIG. 3, a time schedule server 350 translates a playout schedule provided by the playout automation system 310 into a list 265 of cue points 268 which can be requested by the receiving and reproducing device 220. One entry in the cue point list 265 which represents one cue point 268 comprises at least a time stamp which is preferably of the form: hh:mm:ss:ff (hour, minute, second and frame) which is identical to the format of the time code 250. The time stamp of a cue point 268 may also be of the form: hh:mm:ss:ms (hour, minute, second and millisecond), wherein the milliseconds determine the video frame number. Further, a time stamp may also comprise additional data as for example the date the content (audio and/or video data) has been recorded. Additionally, a cue point comprises a list of parameters, meta data or instruction(s) to be executed at the time of the cue point 268.

The generation of the cue point list 265 which is based on the playout schedule temporally decouples the generation of the cue point list 265 from the playout of the playout system 320. Thus, a cue point list 265 associated to a specific program can be established in advance to the emission of the program.

In an alternative approach, the time schedule server 350 does not generate the cue point list 265, but the playout system 320 detects one or several cue points when playing an uncompressed stream of digital content. The playout system 320 replaces in the stream of digital content the respective cue points by time code and establishes in parallel a list 265 of cue points 268. Typically, the time delay introduced by the compression system 330 is sufficient for the process of transmitting the cue point list 265 requested by the receiving and reproducing device 220 from the transmitting device 210, 300 to the receiving and reproducing device 220.

According to a further modification, the content provider supplying a stream of digital content having inserted cue points or cue messages additionally provides a list 265 of cue points 268 associated with the supplied stream of digital content. In this case, the provided list 265 can directly be used by the transmitting device 210 for an application in the method described here. The transmitting device 210, 300 or a component thereof, as for example the playout system 320, replaces the cue points in the stream of digital content by the time code 250.

In another modification, the content provider does not insert cue points 268 in its stream of digital content, but just time code 250 at the positions where it is possible to add content and separately provides an associated list of cue points 265 referring to the inserted time code 250. The parameters of the respective cue points 268 may be added by the transmitting device 210, 300 or can already be provided by the content provider in the cue point list 265.

Referring again to FIG. 2, the TS 235 transmitted by transmitting device 210 via the first connection 230 to the receiving and reproducing device 220 comprises at the beginning of a digital stream of content contained in the TS 235 a signalling 240. For the example of an MPEG-2 TS, the signalling 240 may be contained in program specific information (PSI) transport packets. In more detail, the signalling 240 can be transported within the program association table (PAT).

After the receiving and reproducing device 220 detects the signalling 240, the signalling 240 forces the receiving and reproducing device 220 to request (arrow 270) the cue point list 265 from the transmitting device 210 via a second connection 260. In the example presented in FIG. 2, the second connection 260 is different from the first connection 230. The second connection 260 may be an out-of-band connection. Generally, the term out-of-band means in this application, communications which occur outside the first connection 230. For example, the second connection 260 can be a secured Internet connection using the HTTPS (hypertext transfer protocol secure) protocol in order to encrypt the transmission of the cue point list 265 for the transport from the transmitting device 210, 300 to the receiving and reproducing device 220. Alternatively, the second connection 260 may be an unsecured connection with encoded data, or it may be a combination of both. The second connection 260 can couple the receiving and reproducing device 220 to the transmitting device 210, 300 by means of a wired connection or wirelessly (as for example via a WLAN (wireless local area network)).

In a modification of the example of FIG. 2, the transport stream 235 on the first connection 230 does not have the signalling 240. Instead of the receiving and reproducing device 220 is designed to automatically request the list of cue point data 265 from the transmitting device 210 when detecting the PSI of a new program in the TS 235. This approach has the advantage that the PSI has not to be modified by the transmitting device 210.

According to another implementation, the receiving and reproducing device 220 which is in the following abbreviated as reproducing device 220 in advance requests the cue point lists 265 for the programs to be transmitted in the transport stream(s) 235 of the first connection 230 within a certain period. Exemplary periods may range from about 15 minutes up to several days. This implementation is possible when the generation of cue points list is based on the playout schedule. If the playout schedule is modified for example due to breaking news and/or in case of an emergency, the cue point list of the new program may be indicated by the signalling 240.

Alternatively, after the initialization of the signalling 240, the reproducing device 220 can automatically periodically request a cue point list 265 for the program of the TS 235 which is presently reproduced by the reproducing device 220. The period can have a length ranging for example from a few minutes up to several hours. It is also possible to simultaneously request cue point lists 265 for several or all of the programs contained in the TS 235.

The reproducing device 220 can have additional information stored therein which automatically establishes the second connection 260 from the receiving and reproducing device 220 to the transmitting device 210. The establishment of the second connection 260 can be triggered by the signalling 240 of the TS 235, or may be internally triggered by routines of the additional information stored in the reproducing device 220 without any user interaction. Moreover, the additional information of the reproducing device 220 may comprise routines which authenticate the reproducing device 220 with respect to the transmitting device 210. A certificate necessary for the authentication of the reproducing device 220 may be installed into the reproducing device 220 during its fabrication or may be installed when the firmware of the reproducing device 220 is updated.

As schematically illustrated in FIG. 4, the transmitting device 210 transmits (arrow 480) the requested cue point list 265 to the reproducing device 220 where it is stored as cue point list 465.

FIG. 5 schematically shows some components of an embodiment of a receiving and reproducing device 500. The receiving and reproducing device 500 can be part of a personal computer (PC) or may be a part of a set-top box. The receiving and reproducing device 500 can also be implemented in a television set and/or in audio equipment.

The receiving and reproducing device 500 comprises a transceiver 550. The transceiver 550 comprises a transmitter unit to send data or messages via the second connection 260. Further, the transceiver 550 also includes a receiver unit for receiving data via the second connection 260. The transceiver 550 is coupled to a processor 560 which in turn is connected to a memory 570. The memory 570 can comprise volatile and non-volatile memory. The processor 560 may be a general purpose processor or may be specifically designed for the tasks of the receiving and reproducing device 500. Apart from the connections to the transceiver 550 and the memory 570 indicated in FIG. 5, the processor 560 can also have connections to some further or all of the components of the reproducing device 500 (not illustrated in FIG. 5) in order to control the operation of these components.

The transmitting device 500 comprises a receiving unit 510 for receiving the transport stream 235 via the first connection 230. In the example of FIG. 5, the receiving unit 510 removes the carrier frequency from the TS 235 and outputs a TS comprising one program (i.e. SPTS) or several multiplexed compressed transport streams (i.e. MPTS) to the decompression system 520 or a decoder. The decompression system 520 provides streams of digital content to the monitoring unit 530. Similar to the compression system 330 of the transmitting device 210, 300, the decompression system 520 retains the relationship of the time code 250 and the video frame of its input signal 515 in its output signal 525. This means that the relation of the time code 250 and the video frame of the input signal 325 of the compression system 330 and the output signal 525 of the de-compression system 520 are essentially identical.

The monitoring unit 530 reads the time code 250 contained in an individual stream of digital content and compares the time code 250 with the time stamps of the cue points 468 in the cue point list 465. As already discussed in the context of FIG. 2, the cue point list 465 associated with the stream of digital content presently monitored by the monitoring unit 530 has been transmitted on request by the reproducing device 500 at the begin of the stream of digital content or at the begin of a fixed period from the transmitting device 210, 300 to the reproducing device 220, 500. The cue point list(s) 465 is (are) stored in the memory 570 of the reproducing device 500.

If the monitoring unit 530 does not detect time code 250 in the stream of digital content, it passes the stream of digital content to the splicing unit 540. On the other hand, if the monitoring unit 530 detects a time code 250 which matches the time stamp of a cue point 468 of the cue point list 465, the monitoring unit 530, the splicing unit 540 and/or the processor 560 read the parameter list or the meta data of this cue point 468.

The parameter list can comprise instructions to splice additional content which may be provided by a second content provider or as a secondary content stream at a predetermined point of time into the stream of digital content of the primary content stream. The additional content can be spliced into the stream of digital content for a predetermined period and then the splicing unit 540 switches back to the original stream of content of the primary content stream.

It is also possible to transmit the secondary content stream(s) in a defined period prior to the transmission of the primary content stream and temporally store the secondary content stream(s) in the memory 570 of the receiver 500. If at the reproducing of the primary content stream the stamp time of the cue point 468 matches the time code 250, the splicing unit 540 interrupts outputting the stream of digital content 575 of the primary content stream, fetches for a predetermined time the secondary content stream(s) from the memory 570 and outputs this content as stream of digital content 575.

Alternatively, it is also conceivable to transmit the secondary content stream together with the respective cue point list 465 from the transmitting device 210, 300 to the reproducing device 220, 500 via the second connection 260 and temporally store the secondary content stream in the memory 570. Furthermore, a parameter set of a cue point 468 can also contain a web address or a URL (uniform resource locator) to a server from which the secondary content stream(s) can be downloaded. Moreover, it is also possible that the cue point 468 parameters only contains an ID which references to a first server which provides a link to a second server providing the secondary content stream(s).

In addition to splicing a secondary content stream into a primary content stream, the splicing unit 540 can also add the content of a secondary content stream to a primary content stream. The insertion of a secondary content stream to a primary content stream is for example necessary to add text or a banner to the primary content stream. The addition of the content of a secondary content stream to the primary content stream can be performed by using any of the approaches described above.

Furthermore, instructions in the parameter sets of cue point 468 can enable the reproducing device 500 of FIG. 5 to just remove a portion of the stream of digital content without adding content.

It is also possible that the reproducing device 500 does not immediately generate an output stream of digital content 575 from the received TS, but stores the stream(s) of digital content outputted by the decompression system (decoder) 520 in a persistent part of the memory 570. On request of a user, a stream of digital content stored in the memory 570 is reproduced by the monitoring unit 530 and the splicing unit 540 as described above for the real time generation of the output stream of digital content 575. The cue point list 465 associated with the stored digital content stream can be received via the second connection 260 and stored in the memory 570 of the reproducing device 220 at the beginning or during the reception of the stream of digital content. Alternatively, the cue point list 465 can be requested via the second connection 260 from the transmitting device 210, 300 and received at the reproducing device 500 when starting the reproduction of the stream of digital content stored in the memory 570. Moreover, it is also conceivable that the cue point list 265 is requested when receiving the stream of digital content and to store the requested cue point list 265 as cue point list 465 together with the received stream of digital content in the memory of the receiving and reproducing device 220, 500.

FIG. 6 presents a modification of the communication system 200 of FIG. 2. The communication system 600 of FIG. 6 comprises the transmitting device 210 and the reproducing device 220 as well as the first communication 230 of FIG. 2. On the other hand, the second data connection 260 of FIG. 2 is changed. The transmitting device 210 does not store a generated cue point list, but sends the generated cue point list to a cue point providing entity 680 via a connection 685. The cue point providing entity 680 may be a server. The reproducing device 220 requests (arrow 670) the cue point list 665 from the cue point providing entity 680 via a second connection 690. Similar to the second connection 260 from the transmitting device 210, 300 to the reproducing device 220, 500, the second connection 690 from the reproducing device 200, 500 to the cue point providing entity 680 may be a secured out-of-band connection.

This approach takes the load off the transmitter 210 to establish secured connections 260 to many transmitting devices 22o, 300 and to respond to the requests of many transmitting devices 220, 300 within a small time slot. Additionally, this approach allows to more simply taking a regionalization of the content of a second content provider into account. For example, several or many cue point providing entities 680 may be associated with a single transmitting device 210, 300. The individual cue point providing entities 680 may know the location of the reproducing devices 220 requesting the cue point list 665. Therefore, the server 680 can adapt the parameter lists of the cue points 668 of the list 665 in order to take the location of the reproducing device 220 into account. This enables to present additional content of a second content provider to a user of the reproducing device 220, 500 which is specific to the location of the reproducing device 220 500.

Additionally and/or alternatively, the approach presented in FIG. 6 allows individually designing the secondary content stream to the preferences of an individual user of the reproducing device 220, 500. The preferences of the individual users may be deposited in the respective cue point providing entity 665. In an alternative implementation, user preferences may be stored in a separate unit as for example a specific server and downloaded to the cue point providing entity 680 on request (not indicated in FIG. 6).

The secondary content stream containing the additional data can be transmitted from the transmitting device 210 to the reproducing device 220 in the transport stream 235 of the first connection 230. The secondary content stream may alternatively be stored in the cue point providing entity 680 and transmitted via the second connection 690 in combination with the cue point list 665 from the cue point providing entity 680 to the reproducing device 220, 500. It is also possible to use to the cue point providing entity 680 for authenticating the reproducing device 220, 500 and for storing secondary content stream(s) in a separate unit (not shown in FIG. 6). The reproducing device 220, 500 can download the secondary content stream(s) either directly from the separate unit without using the second connection 690 or may download the secondary content stream(s) via the cue point providing entity 680 and the second connection 690.

The inventive principle may be realized in hardware or may be implemented in software. Software can also comprise firmware. Preferably, a portion of the principle may be realized in hardware and another one may be implemented in software.

Finally, FIG. 7 presents a flow chart 700 of the described method for modifying a stream of digital content. The method begins at step 710. In step 720, the transmitting device 210, 300 monitors a stream of uncompressed digital content and inserts time code 250. In parallel to this process and indicated by step 730, the transmitting device 210, 300 generates a list 265 of cue points 268. The two method steps 720 and 730 are exclusively performed by the transmitting device 210, 300 which is indicated by the dashed boxes.

In step 740, the transmitting device 210, 300 transmits or broadcasts the typically compressed stream of digital content contained in a transport stream 235 via a first data connection 230 to a receiving and reproducing device 220, 500. In a next step 750, the receiver 220, 500 requests the cue point list 265, 665 from the transmitting device 210, 300 or a server 680. The steps 740 and 750 may be interchanged depending on whether the request for a cue point list 265, 665 is triggered by the receiving and reproducing device 210, 500, or is signaled within the transport stream 235.

At step 760, the receiving and reproducing device 220, 500 obtains the cue point list 265, 665 either from the transmitting device 210, 300 or the server 680. Then at step 760, the receiving and reproducing device 220, 500 modifies the stream of digital content when a time code 250 of the stream of digital content matches with a time stamp of a cue point 468 of the cue point list 465. The content to be inserted or added to the stream of digital content is provided to the receiving and reproducing device 220, 500 either within the transport stream 235 via the first data connection 230, the server 680 via a secured second data connection 690 or via a second server. The method ends at step 780.

The method of FIG. 7 can also be used to modify a stream of digital content which is stored in the receiving and reproducing device 220, 500. In one example, the receiving and reproducing device 220, 500 requests the cue point list 465 which belongs to the stored stream of digital content when starting the reproduction of the stored stream of digital content from the transmitting device 210, 300 via the second connection 260 or the server 680 via the connection 690.

The described method reliably prevents manipulation of cue points parameters by malware installed on the receiving and reproducing device 220, 500.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for modifying a stream of digital content received via a first connection at a reproducing device, the stream of digital content comprising at least one time code, the method comprising:
   when reproducing the stream of digital content:
   a. receiving, by the reproducing device, at least one cue point via a second connection, wherein the at least one cue point comprises at least one time stamp;
   b. determining that the at least one time stamp of the at least one cue point matches the at least one time code; and
   c. modifying, by the reproducing device, the stream of digital content at the time indicated by the at least one time stamp in response to a determination that the at least one time stamp of the at least one cue point matches the at least one time code.

2. A method for modifying a stream of digital content transmitted via a first connection by a transmitting device, the stream of digital content comprising at least one time code, the method comprising:
   a. generating at least one cue point for the stream of digital content, wherein the at least one cue point comprises at least one time stamp; and
   b. transmitting the at least one cue point via a second connection, the at least one cue point modifying the stream of digital content at the time(s) indicated by the at least one time stamp based on a determination that the at least one time code related to the stream of digital content matches the at least one time stamp of the at least one cue point.

3. The method of claim 2, further comprising:
   inserting at least one time code into the stream of digital content.

4. A method for modifying a stream of digital content by a cue point providing entity, the stream of digital content being transmitted from a transmitting device to a reproducing device via a first connection, and the stream of digital content comprising at least one time code, the method comprising:
   a. receiving at least one cue point for the stream of digital content, wherein the at least one cue point comprises at least one time stamp; and
   b. transmitting the at least one cue point via a second connection, the at least one cue point modifying the stream of digital content at the time(s) indicated by the at least one time stamp based on a determination that the at least one time code related to the stream of digital content matches the at least one time stamp of the at least one cue point.

5. The method of claim 4, further comprising:
   transmitting, by the reproducing device, at least one request for the at least one cue point.

6. The method of claim 5, wherein said transmitting the at least one request for the at least one cue point is triggered by:
   at least one signaling of the stream of digital content; or
   the reproducing device.

7. The method of claim 5, wherein the at least one request for the at least one cue point is periodically transmitted.

8. The method of claim 5, wherein the at least one request for the at least one cue point is transmitted via the second connection.

9. The method of claim 5, wherein the second connection comprises an out-of-band connection.

10. The method of claim 5, wherein said modifying the digital content comprises one or more of:
- removing digital content;
- exchanging digital content by new digital content; or
- inserting new digital content in the received stream of digital content at the at least one cue point.

11. A reproducing device for modifying a stream of digital content comprising at least one time code, wherein the reproducing device is configured to:
- a. receive the stream of digital content via a first connection and/or means for storing the stream of digital content;
- b. receive at least one cue point via a second connection, wherein the at least one cue point comprises at least one time stamp;
- c. determine that the at least one time stamp of the at least one cue point matches the at least one time code; and
- d. modify the stream of digital content at the time indicated by the at least one time stamp in response to a determination that the at least one time stamp of the at least one cue point matches the at least one time code.

12. A transmitting device for modifying a stream of digital content comprising at least one time code, wherein the transmitting device is configured to:
- a. transmit the stream of digital content via a first connection;
- b. generate at least one cue point for the stream of digital content, wherein the at least one cue point comprises at least one time stamp; and
- c. transmit the at least one cue point via a second connection, the at least one cue point modifying the stream of digital content at the time(s) indicated by the at least one time stamp based on a determination that the at least one time code related to the stream of digital content matches the at least one time stamp of the at least one cue point.

13. A cue point providing entity for modifying a stream of digital content, the stream of digital content being transmitted from a transmitting device to a reproducing device via a first connection, and the stream of digital content comprising at least one time code, wherein the cue point providing entity is configured to:
- a. receive at least one cue point for the stream of digital content, wherein the at least one cue point comprises at least one time stamp; and
- b. transmit the at least one cue point via a second connection, the at least one cue point modifying the stream of digital content at the time(s) indicated by the at least one time stamp based on a determination that the at least one time code related to the stream of digital content matches the at least one time stamp of the at least one cue point.

14. A non-transitory computer accessible memory medium that stores program instructions for modifying a stream of digital content received via a first connection at a reproducing device, the stream of digital content comprising at least one time code, wherein the program instructions are executable by a processor to perform:
when reproducing the stream of digital content:
- a. receiving, by the reproducing device, at least one cue point via a second connection, wherein the at least one cue point comprises at least one time stamp;
- b. determining that the at least one time stamp of the at least one cue point matches the at least one time code; and
- c. modifying, by the reproducing device, the stream of digital content at the time indicated by the at least one time stamp in response to a determination that the at least one time stamp of the at least one cue point matches the at least one time code.

15. The non-transitory computer accessible memory medium of claim 14, further comprising:
transmitting, by the reproducing device, at least one request for the at least one cue point.

16. The non-transitory computer accessible memory medium of claim 15, wherein said transmitting the at least one request for the at least one cue point is triggered by:
at least one signaling of the stream of digital content; or the reproducing device.

17. The non-transitory computer accessible memory medium of claim 15, wherein the at least one request for the at least one cue point is periodically transmitted.

18. The non-transitory computer accessible memory medium of claim 15, wherein the at least one request for the at least one cue point is transmitted via the second connection.

19. The non-transitory computer accessible memory medium of claim 15, wherein the second connection comprises an out-of-band connection.

20. The non-transitory computer accessible memory medium of claim 15, wherein said modifying the digital content comprises one or more of:
- removing digital content;
- exchanging digital content for new digital content; or
- inserting new digital content in the received stream of digital content at the at least one cue point.

* * * * *

UNITED STATES PATENT AND TRADEMARK OFFICE
CERTIFICATE OF CORRECTION

PATENT NO. : 9,854,019 B2
APPLICATION NO. : 14/287958
DATED : December 26, 2017
INVENTOR(S) : Herrfurt et al.

It is certified that error appears in the above-identified patent and that said Letters Patent is hereby corrected as shown below:

In the Claims

Claim 13, Column 16, Line 1, delete "when".

Signed and Sealed this
Eighth Day of May, 2018

Andrei Iancu
*Director of the United States Patent and Trademark Office*